(12) United States Patent
Epstein et al.

(10) Patent No.: US 10,165,315 B2
(45) Date of Patent: Dec. 25, 2018

(54) SYSTEMS AND METHODS FOR PREDICTING AUDIENCE MEASUREMENTS OF A TELEVISION PROGRAM

(71) Applicant: Viacom International Inc., New York, NY (US)

(72) Inventors: Caroline Epstein, New York, NY (US); Fabio Luzzi, New York, MA (US)

(73) Assignee: Viacom International Inc., New York, NY (US)

(*) Notice: Subject to any disclaimer, the term of this patent is extended or adjusted under 35 U.S.C. 154(b) by 120 days.

(21) Appl. No.: 15/295,640

(22) Filed: Oct. 17, 2016

(65) Prior Publication Data

US 2018/0109829 A1    Apr. 19, 2018

(51) Int. Cl.
*H04H 60/32* (2008.01)
*H04N 21/25* (2011.01)
*H04N 21/258* (2011.01)
*H04H 60/66* (2008.01)
*H04H 60/31* (2008.01)

(52) U.S. Cl.
CPC .......... *H04N 21/252* (2013.01); *H04H 60/66* (2013.01); *H04N 21/25883* (2013.01); *H04N 21/25891* (2013.01); *H04H 60/31* (2013.01)

(58) Field of Classification Search
CPC ................................ H04N 21/251; H04N 21/252
See application file for complete search history.

(56) References Cited

U.S. PATENT DOCUMENTS

| | | | |
|---|---|---|---|
| 8,839,291 B1* | 9/2014 | Anderson | H04H 60/45 705/14.25 |
| 9,363,557 B2* | 6/2016 | Morales | H04N 21/44222 |
| 2008/0263578 A1 | 10/2008 | Bayer et al. | |
| 2010/0235219 A1* | 9/2010 | Merrick | G06Q 10/04 705/7.38 |
| 2013/0311408 A1* | 11/2013 | Bagga | G06N 99/005 706/12 |
| 2015/0189351 A1 | 7/2015 | Kitts et al. | |
| 2016/0150280 A1* | 5/2016 | Cui | H04N 21/252 725/14 |
| 2016/0188587 A1* | 6/2016 | Martin | H04W 4/06 707/734 |
| 2016/0292158 A1* | 10/2016 | Todd | G06F 17/30029 |
| 2016/0316268 A1* | 10/2016 | Carmichael | H04N 21/4662 |
| 2017/0161618 A1* | 6/2017 | Swaminathan | G06F 17/30345 |

* cited by examiner

*Primary Examiner* — Gigi L Dubasky
(74) *Attorney, Agent, or Firm* — Fay Kaplun & Marcin, LLP

(57) ABSTRACT

Described herein are apparatuses, systems and methods for predicting audience measurements of a television program. A method comprises inputting a target program for acquisition into a prediction model, wherein the prediction model is based on a plurality of television acquisition performance predictors, and generating a recommendation as to whether the target program should be acquired based on the prediction model and the plurality of television acquisition performance predictors.

20 Claims, 11 Drawing Sheets

Fig. 8

Table 800

| Observed Acquisition Rating | Acquisitions: Training | Acquisitions: Test | % correctly classified: Training | % correctly classified: Test | % correctly classified within 1 class: Test |
|---|---|---|---|---|---|
| 0 to 0.01 | 368 | 98 | 100.00% | 86.73% | 96.94% |
| 0.01 to 0.02 | 451 | 110 | 100.00% | 77.27% | 99.09% |
| 0.02 to 0.04 | 646 | 183 | 100.00% | 80.87% | 99.45% |
| 0.04 to 0.07 | 498 | 114 | 100.00% | 67.54% | 99.12% |
| 0.07 to 0.10 | 190 | 34 | 100.00% | 47.06% | 94.12% |
| 0.10 to 0.15 | 191 | 58 | 100.00% | 58.62% | 89.66% |
| 0.15 to 0.20 | 117 | 21 | 100.00% | 38.10% | 85.71% |
| 0.20 to 0.30 | 113 | 33 | 100.00% | 72.73% | 84.85% |
| 0.30 to 0.40 | 18 | 9 | 100.00% | 44.44% | 100.00% |
| Above 0.40 | 34 | 7 | 100.00% | 100.00% | 100.00% |
| Total | 2626 | 667 | 100.00% | 73.16% | 96.70% |

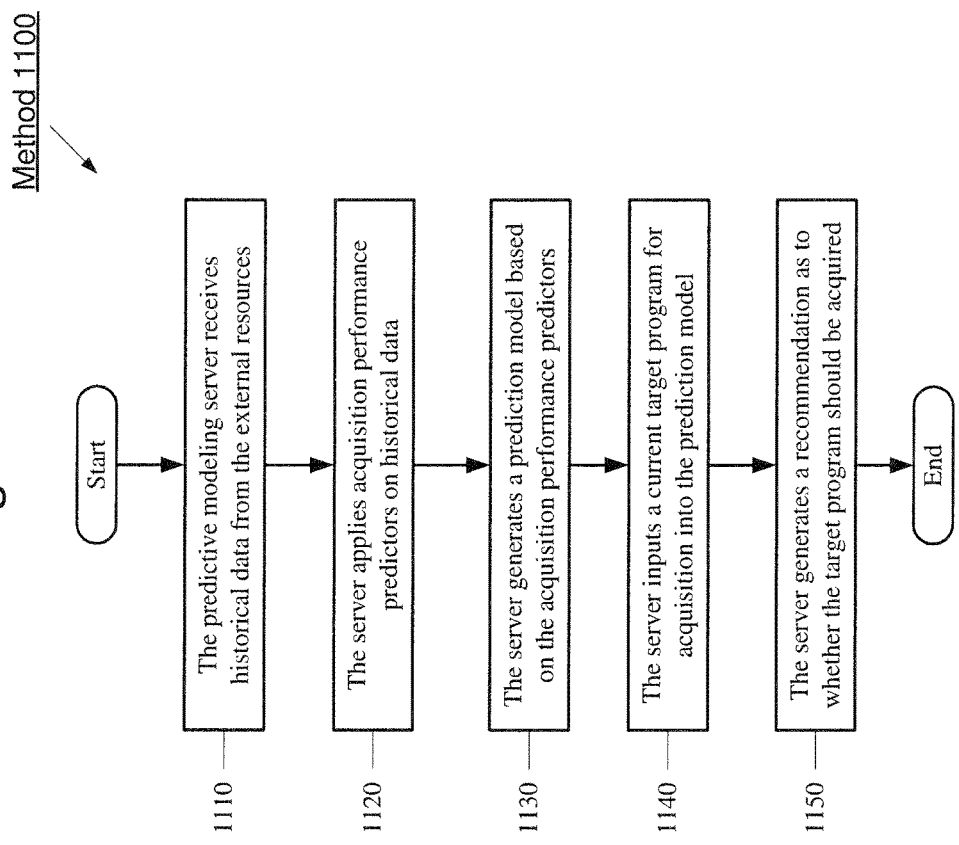

SYSTEMS AND METHODS FOR PREDICTING AUDIENCE MEASUREMENTS OF A TELEVISION PROGRAM

BACKGROUND

Audience measurement, such as television ratings, measures how many people are in an audience in relation to television viewership. Accordingly, audience measurements may be used by broadcasters and advertisers to determine the demographics of who is watching a television program, rather than simply just how many people are watching. For instance, a ratings point may be defined as a measure of viewership of a particular television program. One single television ratings point represents 1% of television households in the surveyed area in a given minute. In other words, if there are an estimated 110 million television households in the United States, a single national ratings point represents 1,100,000 television households.

When used for the broadcast of a program, the average rating across the duration of the show is typically given. Additionally, ratings points may often be used for specific demographics rather than just households. For example, a ratings point among an 18 to 49 year-olds demographic is equivalent to 1% of all the 18 to 49 year-olds in the country.

Additionally, in television broadcasting, the term syndication may refer to the licensing of the right to a broadcast television program by multiple television stations without going through a broadcast network. It is common in countries where broadcast programming is scheduled by television networks with local independent affiliates, particularly in the United States. The three types of syndication may include "first-run syndication", which is programming that is broadcast for the first time as a syndicated show and is made specifically to sell directly into syndication; "off-network syndication", which is the licensing of a program that was originally run on network TV or in some cases first-run syndication (e.g., a "rerun"); and public broadcasting syndication.

Furthermore, streaming media services and an increase in the number of original TV programs have impacted the once-lucrative syndication market. After suffering major losses on network hits, cable executives now have to scrutinize the value of rerunning a successful show before they invest in it. With this in mind, it would be beneficial to predict audience measurements of a television program for syndication to allow the media industry make quick decisions that will benefit brands and their audiences.

SUMMARY

Described herein are apparatuses, systems and methods for predicting audience measurements of a television program. The method may include receiving historical data from the external resources, retrieving prediction data by applying a plurality of acquisition performance predictors on the historical data, creating a prediction model based on the plurality of acquisition performance predictors, inputting a target program for acquisition into the prediction model, and generating a recommendation as to whether the target program should be acquired based on the prediction model and the plurality of acquisition performance predictors on the historical data.

Further described herein is a non-transitory computer readable storage medium with an executable program stored thereon, wherein the program instructs a processor to perform actions for predicting audience measurements of a television program. The actions may include receiving historical data from the external resources, retrieving prediction data by applying a plurality of acquisition performance predictors on the historical data, creating a prediction model based on the plurality of acquisition performance predictors, inputting a target program for acquisition into the prediction model, and generating a recommendation as to whether the target program should be acquired based on the prediction model and the plurality of acquisition performance predictors on the historical data.

Further described herein is a system for predicting audience measurements of a television program. The system may include a memory storing a plurality of rules, and a processor coupled to the memory and configured to perform actions that include receiving historical data from the external resources, retrieving prediction data by applying a plurality of acquisition performance predictors on the historical data, creating a prediction model based on the plurality of acquisition performance predictors, inputting a target program for acquisition into the prediction model, and generating a recommendation as to whether the target program should be acquired based on the prediction model and the plurality of acquisition performance predictors on the historical data.

DESCRIPTION OF THE DRAWINGS

FIG. 8 shows a table listing the breakdown of day part-specific acquisitions and each possible response, wherein the number of acquisitions per response category are listed separately for the training and test sets according to an exemplary embodiment described herein.

FIG. 11 shows an exemplary method for predicting audience measurements of a television program according to the exemplary embodiments.

DETAILED DESCRIPTION

Figure 1:
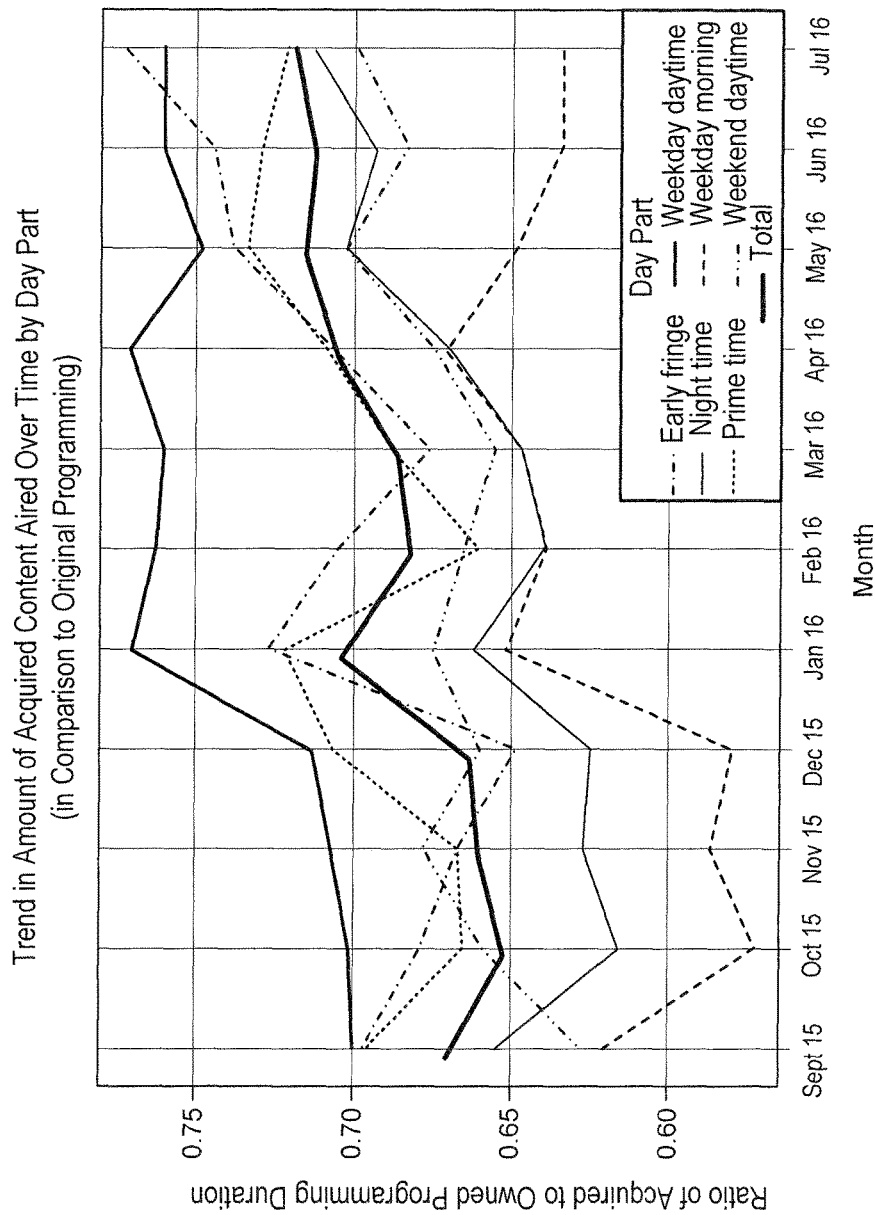
FIG. 1 shows a trend in the amount of acquired content aired over time by day part in comparison to original programming.

The exemplary embodiments may be further understood with reference to the following description and the appended drawings, wherein like components are referred to with the same reference numerals. The exemplary embodiments describe systems and methods for predicting audience measurements of a television program. For instance, the systems and methods may create and utilize an analytical application to predict whether an acquired non-original television program (e.g., a rerun program, off-network syndicated program, etc.) will do well on a specific acquiring television network. Streaming multimedia services and an increase in the number of original TV programs have impacted the once-lucrative syndication television market. After suffering major losses on network hits, cable executives now scrutinize the value of rerunning a successful show before investing resources in it. As will be described in greater detail below, the exemplary application may use statistical and machine-leaning techniques, such as, but not limited to, clustering, predictive modeling, collaborative filtering, etc. Accordingly, the exemplary systems and methods may help the media industry make quick decisions that will benefit brands and their audiences.

During the current era of "24/7" broadcasting, networks often complement original content with syndicated TV series or movies that were successful on other stations in order to deliver a sufficient variety of content to their audiences. While sometimes considered a secondary priority to original programming, these acquisitions constitute a surprisingly large portion of network schedules (e.g., covering about 35% of the total program day across all television programming). As indicated in graph 100 of FIG. 1, the trend shows no sign of slowing down. Specifically, as observed across all day parts, the number of acquisitions has increased in the past year relative to the number of original programming aired. It is noted that "day part" refers to a time category of the broadcast day. For instance, a broadcast day may be separated into day parts such as early fringe, night time, prime time, weekday daytime, weekday morning, weekend morning, etc. Furthermore, the market itself is also enormous, with subscription video on-demand ("SVOD") services alone spending nearly $7 billion on syndicated programming in 2015. It is noted that these trends are not limited to the US either, as European broadcasters spend upwards of $5 billion acquiring television programs each year.

Despite the sizeable investments that continue to be made in the industry, the advent of streaming multimedia services and an increase in original programming have diminished the returns that acquisitions produced for television networks in the past. However, it may be unwise for traditional networks to shift their strategy to investing solely in original content because studios would likely reconcile their lost revenue by signing even more deals with streaming services, bolstering the already-vast catalogues of linear television's competitors. Thus, the solution should not be to acquire less, but to acquire smarter.

On both traditional broadcast and digital multimedia platforms, brands across the video entertainment industry typically employ acquisition teams that are responsible for identifying programs that are expected to perform well with their audience and for providing explanations as to why their choices will be successful. However, the factors that acquisition experts cite may be ambiguous and difficult to quantify. Therefore, these factors are measured by instinct more often than advanced analytics. This has caused erratic acquisition performance across the industry, wherein buying syndicated shows is more art than science as currently practiced.

According to the exemplary embodiments described herein, systems and methods may use statistical and machine-learning techniques to allow a television network to exploit the compatibility that their core audience inherently has with off-brand content, thereby allowing the network to make more cost-effective acquisition decisions. With these goals in mind, a number of factors may be identified that may indicate program performance. The exemplary systems and methods may harness the power of statistical and machine-learning techniques, such as clustering and collaborative filtering, while being tailored to quantify each variable of interest. In addition, historical samples over a predetermined period of time (e.g., 1,100 historical acquisitions over the past three years) may be applied to the systems and methods for each acquisition to obtain a full predictor-response data set. Furthermore, a predictive model may be trained on this historical dataset to address to primary concern for any future acquisition, namely, whether a program of interest will perform well on a certain network if it was to be acquired.

The exemplary predictors for acquisition performance prediction modeling may be limitless. However, a few examples of the model predictors may include, but are not limited to, the brand and/or network acquiring the program (e.g., the acquiring network, the brand/network that the program is being acquiring from (e.g., the source network), the day part during which the acquiring network will air the program, the day part during which the source network aired the program, etc. As will be described in greater detail below, further predictors may include the current size (or average ratings) of the acquiring network during the acquiring day part, the rank of the source network in terms of recency of air, audience similarity, duplication (e.g., the percent of acquiring network's audience that has already seen the acquisition on the source network), a resting period (e.g., days since the network has aired the acquisition), program ratings on source network in source day part in the acquiring network's target demographic, etc.

Additional predictors may also include content compatibility based on memory-based collaborative filtering, content compatibility based on model-based collaborative filtering, an indicator for whether the acquisition will be shared among multiple networks, source network size (or average ratings) during the last year of program air in the source day part in the acquiring networks target demographic, the current size (or average ratings) of the acquiring network in the source day part and in the acquiring network's target demographic, etc. Another predictor may account for repeat degradation, which may be described as an indicator of whether repeats tend to do significantly worse on the source network compared with original airings.

The predictors may also account for combinations of the above-references factors, such as a ratio of the current size of the acquiring network in the source day part and in the acquiring network's target demographic is divided by source network size during the last year of program air in the source day part in the acquiring networks target demographic. This ratio may illustrate how the acquiring network compares with the source network in terms of popularity. A program rating to source network rating ratio may be used as a predictor, wherein program ratings on source network in source day part in the acquiring network's target demographic is divided by source network average ratings during the last year of program air in the source day part in the acquiring networks target demographic. This ratio may illustrate how the program may be over or under-indexed compared to the source network average.

Aside from the accuracy of insights that these exemplary systems and methods provide, the democratized data science of the exemplary algorithms described herein may be implemented within an interactive, easy-to-use, and visually pleasing application. Accordingly, this acquisition application may be used to evaluate potential acquisitions in seconds, and users may be confident in the recommendations that are made, even if the users do not have expertise in data science.

The target television programming for acquisition may include high-profile acquisitions such as exclusive SVOD licensing rights (e.g., old-time favorites, current hit series, etc.). However, simply because an acquisition is "high profile" and the deal makes headlines, it does not necessarily mean that the deal will be successful. Certain syndicated programs, such as Seinfeld and Law & Order, have proven their rerun shelf life, others have proven to be unsuccessful. Some acquisitions have failed because they may be considered "cult hits" that lacked appeal to a new, more general audience. Others have failed because they were acquired too soon after they premiered and had not yet proven that they could retain an audience. In general, however, the reasons that acquisitions under-deliver are not well understood, and even "sure bets" can fail for reasons that seem inexplicable.

Figure 2:
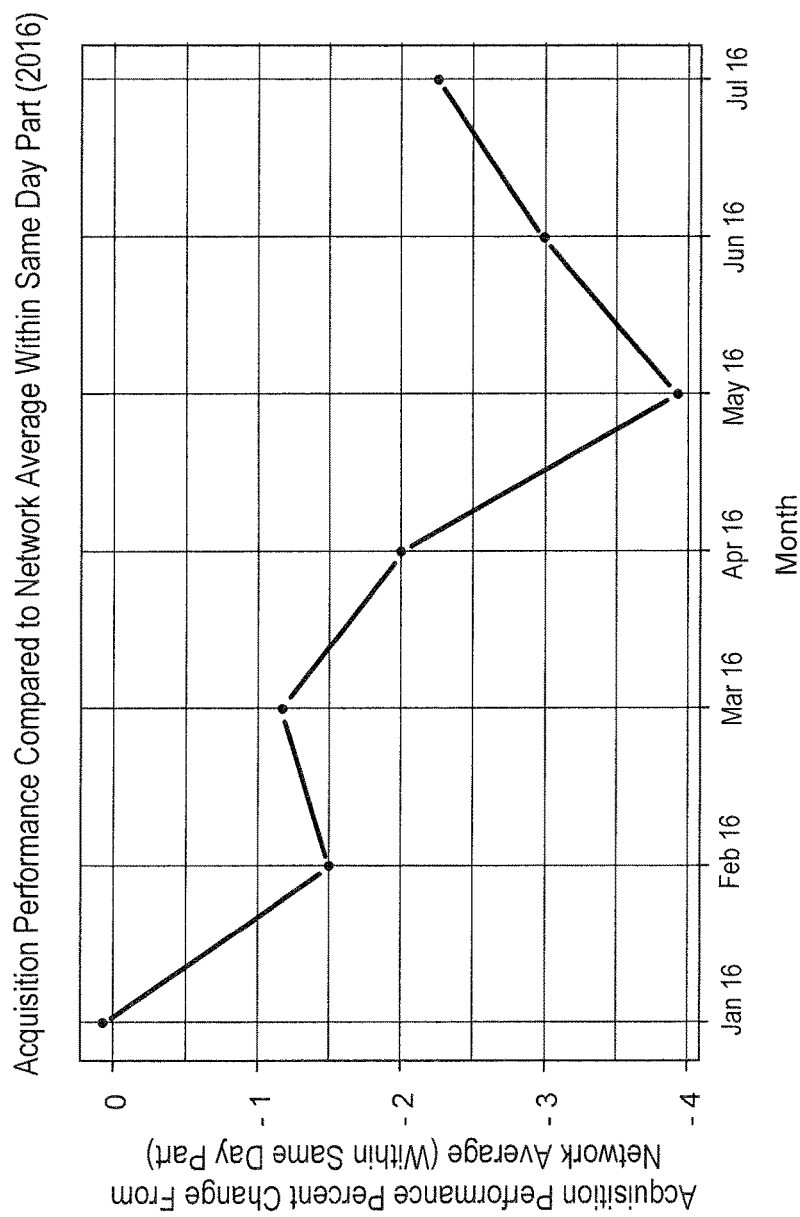
FIG. 2 shows that historical acquisitions have produced ratings up to 4 percent below the acquiring networks' mean performance, on average, each month to date in 2016.

Regardless of the specific reasons as to why a program succeeds or fails on the acquiring network, it is clear that acquisitions behave unpredictably. While individual performances may vary widely, collectively acquisitions tend to perform worse (in terms of rating points) than the acquiring network's average during the specific day part in which the acquisition airs. As illustrated in graph 200 of FIG. 2, historical acquisitions have produced ratings up to 4 percent below the acquiring networks' mean performance, on average, each month to date in 2016. This implies that there are relatively more unsuccessful acquisitions than successful acquisitions. The exemplary systems and methods described herein will leverage advanced statistical and machine-learning techniques to offer data-driven acquisition recommendations and thus reverse these statistics.

According to the exemplary systems and methods described herein, the predictive acquisition modeling may use data including a telecast dataset (e.g., live viewing and on-demand viewing) as well as a viewer dataset (e.g., more than 100 demographic and socioeconomic factors) provided by audience research and measurement outlets (e.g., Nielsen). A primary predictor of acquisition performance may be centered around one driving factor, namely, the program's audience. A network may prefer to acquire programs that target their own core audience. This may be due to a belief that if their viewers are similar to the program's original audience, their viewers will enjoy the content, and thus the acquisition will perform well. Accordingly, the exemplary systems and methods may be utilized to quantify how similar the acquiring network's core audience is to the program's historical fan base.

Figure 3:
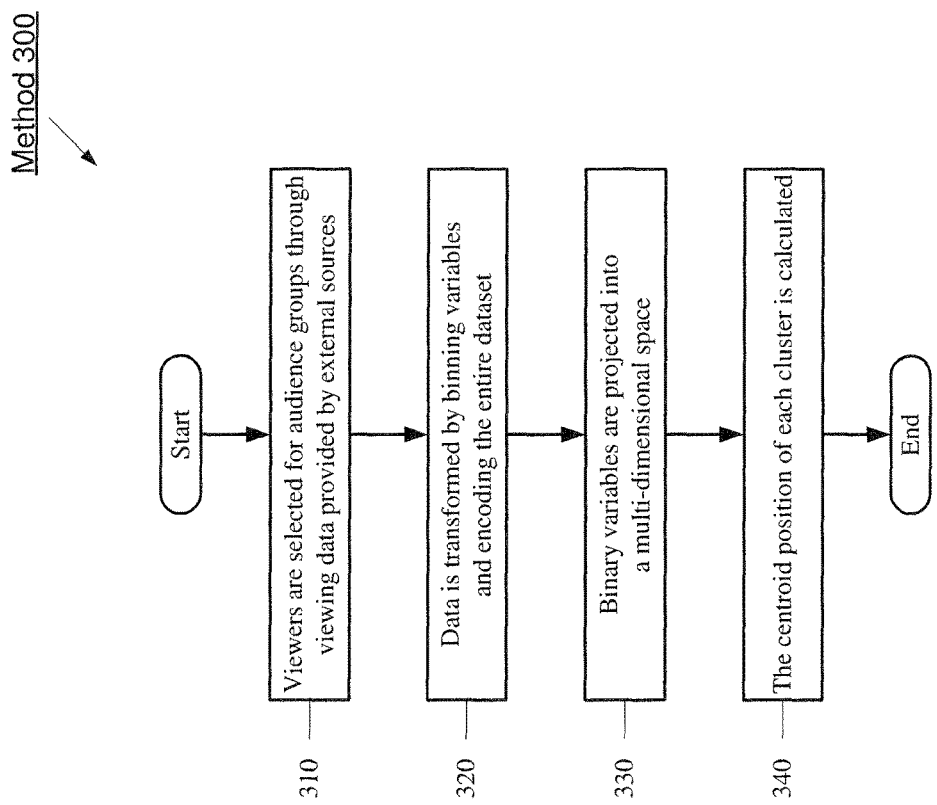
FIG. 3 shows an exemplary method to gauge audience similarity for predicting audience measurements of a television program according to an exemplary embodiment described herein.

Furthermore, FIG. 3 shows an exemplary method 300 to gauge audience similarity for predicting audience measurements of a television program according to an exemplary embodiment described herein.

In 310, viewers may be selected for the two audience groups through viewing data provided by external sources (e.g., Nielsen). The acquiring network's core audience may be defined to be viewers in the top quintile in terms of minutes viewed within the most recent one-year time period. Likewise, the program's fan base may be comprised of viewers in the top 20 percent in terms of minutes viewed on the original network. Each viewer may be described by a large set of demographic and socioeconomic attributes, such, as for instance, categories that pertain to the viewer's age, gender, race, education level, occupation, geographic location, income and wealth, language, household size and composition, etc.

In 320, the data may be transformed by binning the continuous variables and performing a "one-hot encoding" across the entire dataset that may expand these original number of categorical variables (e.g., 15 variables) into a much greater number of simulated or "dummy" variables (e.g., 49 dummy variables). It is noted that "one-hot encoding" may refer to the transformation of a categorical variable with X categories (or "levels") to X binary variables. For example, a gender variable with two levels, "Female" and "Male," may be transformed to two binary variables (e.g., values usually being 0 for no, and 1 for yes).

The transformation step 320 may be used to weigh each variable, such as when calculating an audience similarity metric. In 330, binary variables may be projected into a multi-dimensional space (e.g., 49-dimensioanl space), thereby creating two clusters, namely, one for each audience. Since these clusters may be pre-defined, in 340 the position of the centroid, or center, of each cluster may be calculated. Thus, in 350, audience similarity may then be defined as the inverse of the Euclidean distance between the two cluster centroids.

Figure 4:
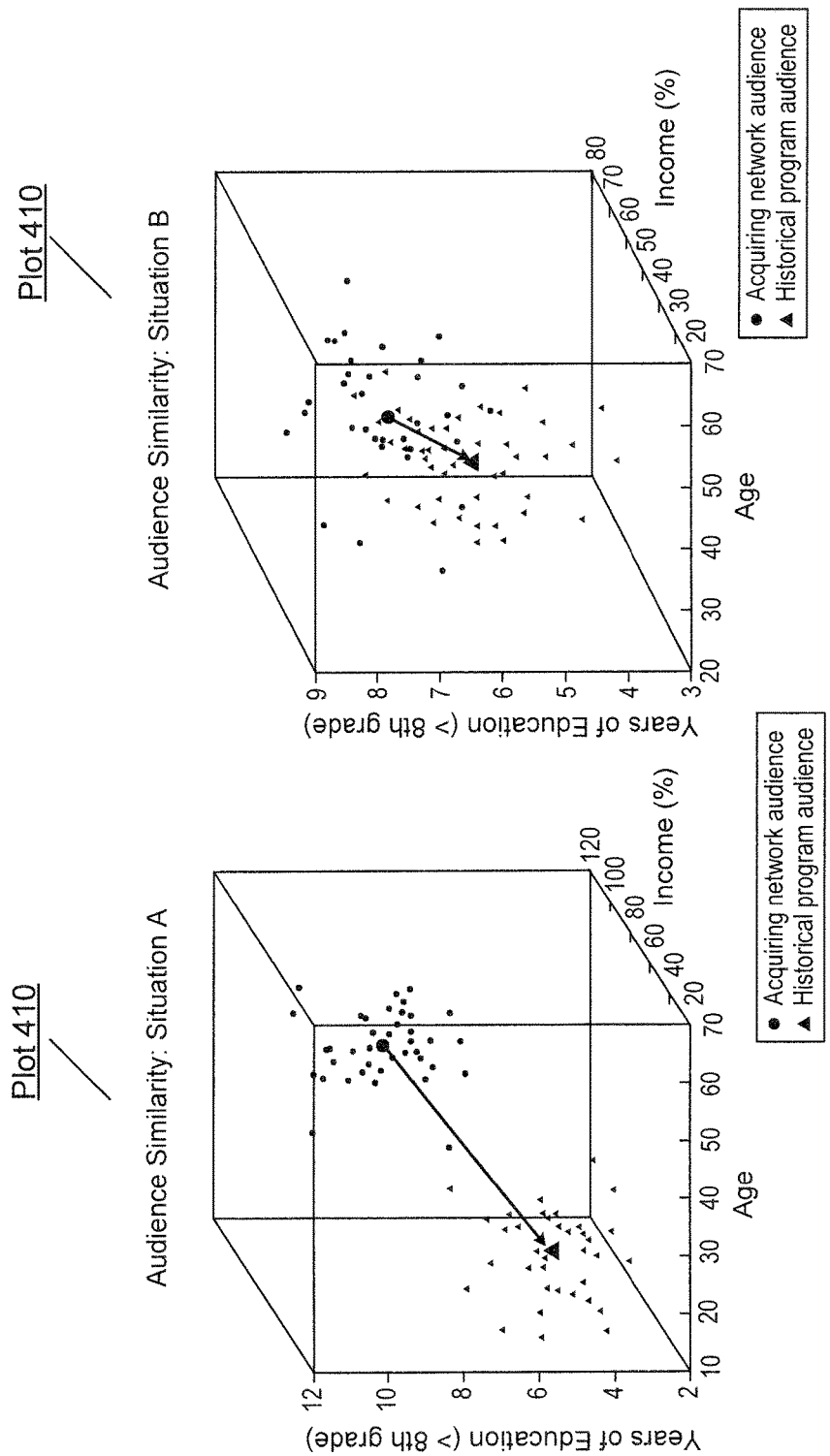
FIG. 4 shows two exemplary plots and illustrating audience similarity for two distinct situations, namely a low audience similarity score in plot and a high audience similarity score in plot, according to an exemplary embodiment described herein.

FIG. 4 shows two exemplary plots 410 and 420 illustrating audience similarity for two distinct situations, namely a low audience similarity score in plot 410 and a high audience similarity score in plot 420. In each plots of audience similarity 410 and 420, simulated (or dummy) data may be used to demonstrate how two artificial audiences compare based on three continuous exemplary attributes: age, education level, and income. In situation A of plot 410, the historical program audience is a young, high school-educated group who makes around $40,000 per year, and the acquiring network audience is generally an older crowd who mostly has post-graduate degrees and makes upwards of $100,000 per year. The two audiences are clearly defined, and their cluster centers are relatively far apart. Thus, the two audiences of plot 410 would receive a low similarity score. In situation B of plot 420, the viewer groups have similar attributes, and there is no viable way to define or enclose the clusters without some degree of error. Furthermore, the cluster centers have little distance between them. Thus, the two audiences of plot 420 would receive a high similarity score.

While audience likeness may be a desirable factor when acquiring television programs, it may be understood that audience likeness may not tell the whole story. For example, twins who have similar or even identical demographic and socioeconomic attributes may have different opinions about a particular program. This difference of opinion would not be explained by demography but rather by viewing preferences. Therefore, content compatibility of a program on the acquiring network may also be taken into account when considering an acquisition. According to the exemplary systems and methods described herein, various approaches may be taken with regard to quantifying content compatibility. For instance, a memory-based collaborative filtering method may be used to understand how similar the acquired content is compared to content that the acquiring network's fan base favors. Additionally, a tailored, model-based collaborative filtering approach may be used to predict how the network as a whole would rate the acquired content.

The exemplary systems and methods described herein may utilize collaborative filtering, which may refer to a mechanism (e.g., a plurality of algorithms) that analyzes data about users, such as television viewers, interacting with items, such as television programs, to draw conclusions about the similarity of users and/or items, as well as to make recommendations.

For instance, one exemplary collaborative filtering application may use a memory-based approach to calculate the similarity of each program on television to every other program to determine whether a given acquisition is similar to the programs that an acquiring network already knows that their fans enjoy. Memory-based collaborative filtering approaches may be applied over user-rating data. For example, if a user-based restaurant rating company employs this approach to identify similar restaurants based on users' taste in food, an exemplary dataset may be comprised of user ratings (e.g., 1 to 5 star ratings). In the case of television programming, minutes viewed (e.g., per Nielsen) of every program on television may be used as the measure of viewer affinity, which may be considered to be more accurate than ad-hoc self-reported ratings.

Figure 5:
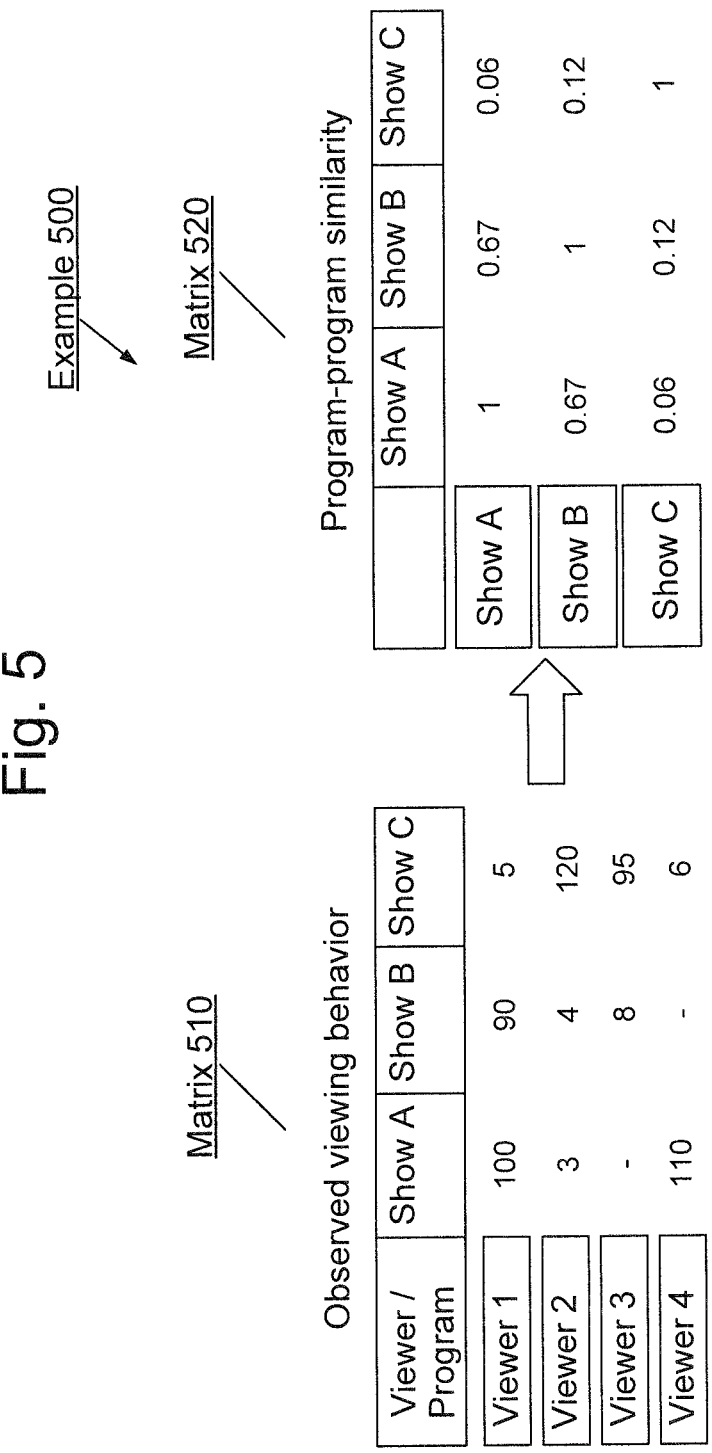
FIG. 5 shows a simplified example of memory-based item-to-item collaboration filtering in which there are three television programs and four potential viewers according to an exemplary embodiment described herein.

FIG. 5 shows a simplified example 500 of memory-based item-to-item collaboration filtering in which there are three television programs and four potential viewers according to an exemplary embodiment described herein. The entries in a viewer-program matrix 510, entitled "Observed viewing behavior," illustrates the minutes viewed of each show by each of the four viewers. The entries in a program-program matrix 520, entitled "Program-program similarity," illustrates the calculated cosine similarities between all three program combinations. It is noted that cosine similarity may measure the cosine of the angle between two non-zero vectors. Accordingly, it may be used as a measure of similarity, ranging from 0 (e.g., least similar) to 1 (e.g., maximally similar).

By using the constructed viewer-program matrix 520, each program's similarity (e.g., based on viewer behavior) may be measured to every other program by calculating the cosine similarity for every pairwise combination of columns in the matrix. For instance, as illustrated in matrix 520, when viewers watch a relatively large amount of program A, they also tend to watch a large amount of program B. Conversely, viewers who do not enjoy program A also do not enjoy program B. Therefore, these two programs may be considered similar in terms of viewer behavior, and thus have high cosine similarity. On the other hand, viewers who watch programs A and B tend not to watch program C and vice versa. Consequently, both A and B may have low cosine similarity with program C.

Figure 6:
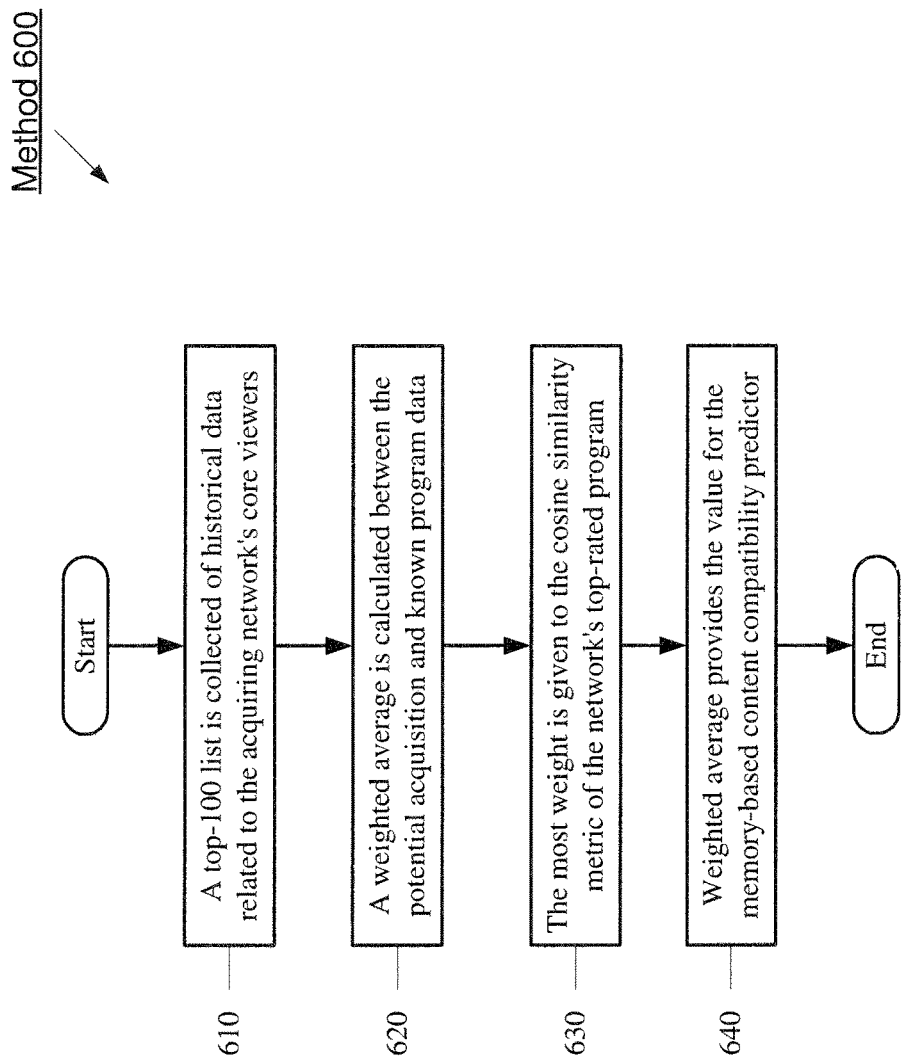
FIG. 6 shows an exemplary method to use collaborative filtering for predicting audience measurements of a television program according to an exemplary embodiment described herein.

FIG. 6 shows an exemplary method 600 to use collaborative filtering for predicting audience measurements of a television program according to an exemplary embodiment described herein.

In 610, a list may be collected of historical data, such as a top-100 program list that the acquiring network's core viewers watch when a network is considering a potential acquisition. In 620, by using the program-program similarity matrix 520, a weighted average may be calculated of cosine similarity metrics between the potential acquisition and the programs known to be enjoyed by network's viewers. In 630, the most weight may be given to the cosine similarity metric of the network's top-rated program and sequentially less weight to each program thereafter. Accordingly, in 640, this weighted average may provide the value for the memory-based content compatibility predictor. Programs that are more similar to the content that the acquiring network's fans currently prefer may receive a high memory-based content compatibility score, which is expected to be positively correlated with acquisition performance.

The further exemplary application of collaborative filtering is model-based, whereby machine-learning algorithms may be used to discover latent factors in ratings data. These latent factors, which are identified for both viewers and programs, are expected to explain the ratings data user to train the machine-learning algorithms and allow for predictions to be made for the unobserved ratings. For instance, model-based algorithms may take in ratings data similar to viewer-program matrix 510 of FIG. 5, learn the latent features of the training set through matrix factorization, and then estimate the user-item values (e.g., viewer-program values) that are missing, such as for viewer 3 on show A or for viewer 4 on show B in matrix 510, based upon the set of known ratings.

However, model-based collaborative filtering may not be used to estimate program ratings (or minutes viewed) for viewers where data may be missing. Instead, the problem is reimagined as one that concerns network ratings. In other words, each network has only aired a handful of all television programs, namely, those that it originally commissioned and produced and those that it already acquired. Accordingly, performance of those programs on brand may be measured by their Nielsen ratings. However, the Nielsen ratings for programs that the network has not yet aired would be missing. Therefore, matrix factorization may be used to estimate the ratings.

Figure 7:
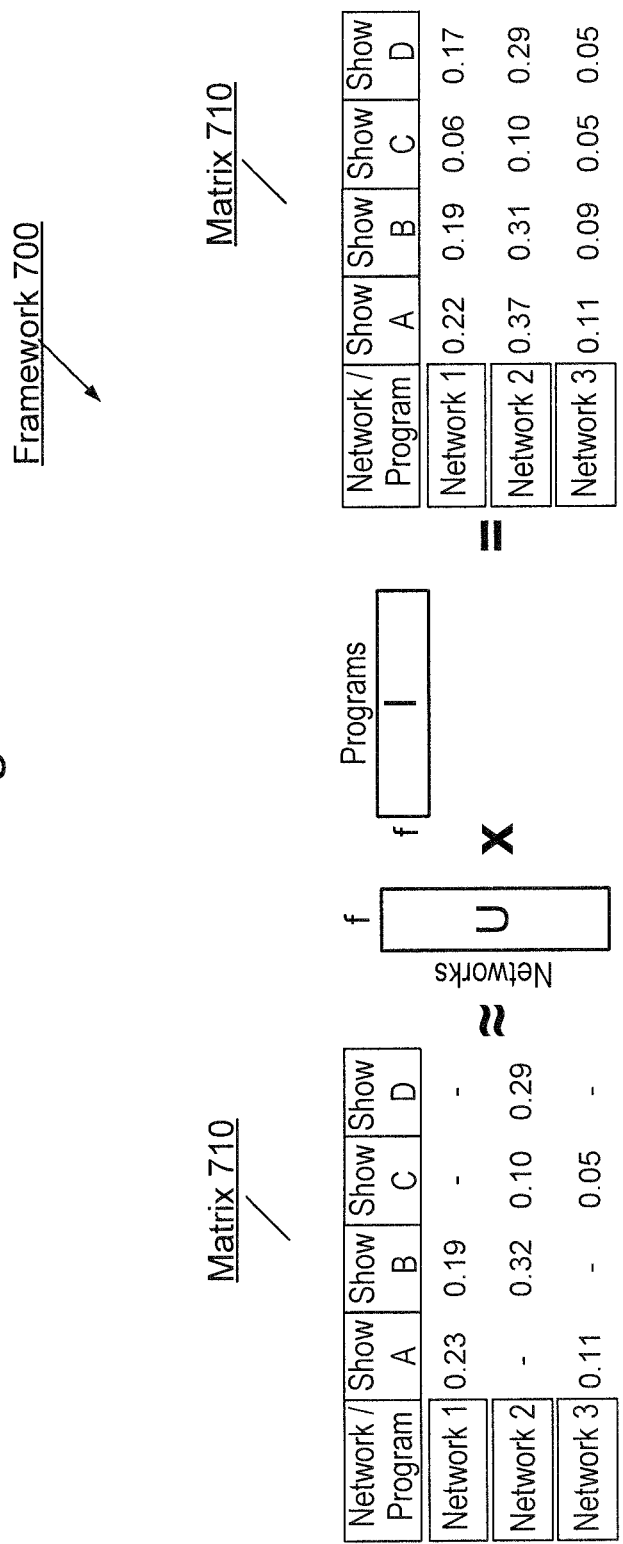
FIG. 7 illustrates a simplified framework for predicting network ratings of programs that have not yet aired using matrix factorization in which there are three networks and a total of four possible programs according to an exemplary embodiment described herein.

FIG. 7 illustrates a simplified framework 700 for predicting network ratings of programs (e.g., Nielsen ratings) that have not yet aired using matrix factorization in which there are hypothetically only three networks and a total of four possible programs. The matrix on the far left is an input ratings matrix 710 wherein entries may be calculated Nielsen ratings for the programs that have already aired on each given network and missing or null for those than have not aired. Model-based collaborative filtering (e.g., matrix factorization) may learn latent network and program vectors, U and I, which model the training ratings dataset to approximate the known ratings and predict the missing entries.

The predicted ratings for the missing entries may be calculated based on the patterns (e.g., network and program latent factors) that collaborative filtering learns using the known ratings for each network. Accordingly, these predicted ratings may provide a network behavior-based prediction for how potential acquisitions will perform on the acquiring network, as illustrated in matrix 720.

It is noted that some of the most fundamental variables to account for in a model to predict acquisition performance may be related to the parties involved in the acquisition deal, namely, the acquiring network and the source network. Accordingly, network-level variables may be considered to understand how these two networks perform as a whole and how they compare. For instance, the size of the source network may be estimated during each day part by its average ratings during the last year that it aired the program being considered for acquisition, within the age bracket targeted by the acquiring network. Similarly, the acquiring network's size may be calculated as the current average ratings with regard to its own target demographic. It is then possible to quantify how the networks compare by taking a ratio of the two day part and demo-specific ratings (e.g., acquiring network rating over source network rating). This quotient may thusly represent the size of the acquiring network relative to the source network.

In situations in which there are multiple source networks or multiple acquiring networks, these multiple entities may be treated as such. In other words, predictors may be calculated for all previous networks that aired the acquisition. For these cases, though, a variable may be included that indicates a relative recency of the source networks. Even though one particular network originally commissioned a television program, it may not be the most relevant or predictive network on which to model. Perhaps some of the more recent networks would be more indicative of acquisition performance. To understand the latter question of multiple acquiring networks, a variable may be included to indicate whether an acquisition will be shared among multiple networks because shared acquisitions may be cannibalistic (e.g., within the same family of channels, owned by a common owner).

An exemplary acquisition system and/or method may also consider program performance during previous transmissions of the series. Accordingly, a feature to include as a predictor may be a program's Nielsen ratings on the source network within the acquiring network's target demographic during each of the source day parts in which it aired. In the same vein, a further feature may be calculated to indicate how much the program over-indexes or under-indexes compared to the network average by taking a ratio of program ratings compared to the source network's average ratings during the specified day part. Since acquired programming implies the rights to air repeats, special attention may be paid to how ratings for repeat episodes compare to ratings for original episodes. Thus, a feature called "repeat degradation" may be constructed that is a function of the ratio of the repeat ratings and the original ratings.

Furthermore, some predictors may be assembled that may indicate whether the acquiring network's audience members will be receptive to the acquisition. For instance, for an audience to be receptive, they need to be available. Therefore, the day part in which the acquiring network intends to air the program may be accounted for as well as the acquiring network's ratings during this day part. For example, a program generally performs better during prime time than it would at 2:00 a.m. due to the size of the available audience. It may also be determined if the acquiring network's audience has grown tired of the program. Accordingly, a "resting period" of the acquisition may be measured as the number of days since the source network last aired the program and "duplication" as the percentage of the acquiring network's audience who has already seen the program.

With regard to a comprehensive predictive model, an exemplary predictive model may be built using the features identified above as predictors. This model may be used to understand which features are truly indicative of acquisition performance and to forecast how any future acquisition would perform on a specific network or family of networks. According to one exemplary embodiment, a dataset may include a pool of several various acquisitions (e.g., source network-specific acquisitions, day part-specific acquisitions, day part- and source network-specific acquisitions, etc.) that have occurred since Jan. 1, 2013. The exemplary dataset may be television series that had sufficient airings on both the source and acquiring networks (e.g., seven or more episodes). While this dataset may be limited to television series acquisition, it is noted that the exemplary embodiments may be applied to any other forms of media, such as movies, mini-series, documentaries, sporting events, music and music-related events, Internet-based content, radio, video games, etc.

All of the identified features may be calculated for each acquisition and considered the time that the acquisition took place. For example, if a network acquired a program in 2014, the audience similarity may be calculated as the likeness of the program's historical fan base (e.g., during the last year that it aired on the source network) to the acquiring network's audience in 2014, not the current audience. Furthermore, the model may avoid introducing any future knowledge (e.g., known data that was not available at the time of acquisition) into the predictors, so the model would perform equally well for acquisitions moving forward.

The response variable in the exemplary model may be observed day part-specific acquisition ratings during the first 12 months of air on the acquiring network. The responses may be binned into 10 ordinal groups to dilute some of the variation that occurs with program ratings and because categorical data tends to lend itself to a wider variety of machine-learning algorithms. FIG. 8 shows a table 800 listing the breakdown of day part-specific acquisitions and each possible response (e.g., from a random forest model), wherein the number of acquisitions per response category are listed separately for the training and test sets as well as the accuracy of the predictions per class. Note that multiple observations constitute a single day part-specific acquisition if they are from different source day parts or source networks.

Randomly, 80 percent of the day part-specific acquisitions—subsets of data may be selected, not necessarily single observation—to train the model on, reserving the other 20 percent for testing. A random forest with 128 trees may be employed as a classifying model because it is a flexible algorithm that allows for data spanning multiple (>2) classes and may capitalize on non-linear correlations between the predictors and the response. The random forest may be fit with only the training set and validate the model on the test set to ensure that it would not be exceptionally overfit. It is noted that overfitting (e.g., when a model learns the irregularities of the dataset it is trained on, as opposed to the true underlying relationships) may be a common phenomenon with complex models. Since random forest models are fit by drawing a different random sample from the data for each decision tree and since relationships between predictors and the response may vary by acquiring network, the data may be stratified by acquiring network during the sampling process for each tree.

As illustrated in Table 800, the random forest model learned the relationships in the training set very effectively, classifying 100 percent of the acquisitions correctly. Undoubtedly, some of the learned associations describe the idiosyncrasies of the training set as opposed to general behaviors. However, the model still performed arguably well on the test set, predicting 73.16 percent of the acquisitions in the correct response category. Since the response classes are ordinal opposed to nominal, a degree of deviation may be measured from the correct class for the acquisitions that were predicted incorrectly: 96.70 percent of the test set acquisitions were predicted correctly or within one class removed from the correct response category. This implies that most of the acquisitions that the model classified incorrectly were still close to being accurate. For example, as shown in Table 800, 77.27 percent of the test set acquisitions that rated between 0.01 and 0.02 on the acquiring network were predicted correctly in that class; however, 99.09 percent were predicted correctly or within one class, meaning that they were predicted to fall into the 0 to 0.01, 0.01 to 0.02, or 0.02 to 0.04 response categories.

Collectively, the test set results are convincing. The prediction accuracy across each of the 10 response groups, however, varies widely. For example, only 38.10 percent of the test set acquisitions that rated in the 0.15 to 0.20 group were predicted correctly, which is in stark contrast to the 86 percent of acquisitions that were predicted correctly in the 0.0 to 0.01 response category. This is due in large part to the imbalance in acquisitions across classes. Random forests, among most other machine-learning classification algorithms, tend to perform better on data with balanced classes (e.g., a relatively equal number of observations in each response category) because their objective is to minimize the overall error rate opposed to paying particular attention to rare classes.

In this case, forcing balance across classes may present disadvantages. If the responses are binned by equidistant quintiles, the differences between resulting classes may be meaningless for most networks because the majority of acquisitions tend to fall into low rating groups. For example, using rating deciles as cutoffs for the 10 response groups creates categories that begin with (0, 0.007) and (0.007, 0.01). The difference between these groups may be too trivial to provide any perceivable value. At the other end of the spectrum, the highest decile group encompasses all acquisitions that rate above 0.16, which may not provide nearly enough precision for most networks.

Aside from the predictions themselves, the most valuable information that may be deduced from this model is an understanding of which predictors and controlling variables may be considered truly indicative of acquisition performance. For instance, Mean Decrease Gini, a measure of variable importance based on the Gini impurity index, may be used to measure the relative importance of each feature in the model. This metric quantifies the average improvement in prediction accuracy (e.g., class "purity") gained from including each feature, separately, in the decision trees. Variables that may be considered more important are presumed to split a larger proportion of observations into their correct classes. Higher values in Mean Decrease Gini are associated with more predictive features.

By calculating Mean Decrease Gini for the features used in the random forest model, it can be found that relevant controlling variables may include the day part in which the acquiring network airs the acquisition and its size (e.g., average Nielsen rating) during that day part. The most important predictors may pertain to the content compatibility of the acquisition. It is noted that both content compatibility predictors may be considered relevant to the model since they are meant to estimate the same feature. Apparently, the two methods provide different valuable information because if they were highly correlated, the model would naturally consider only one of the two relevant.

Figure 9:
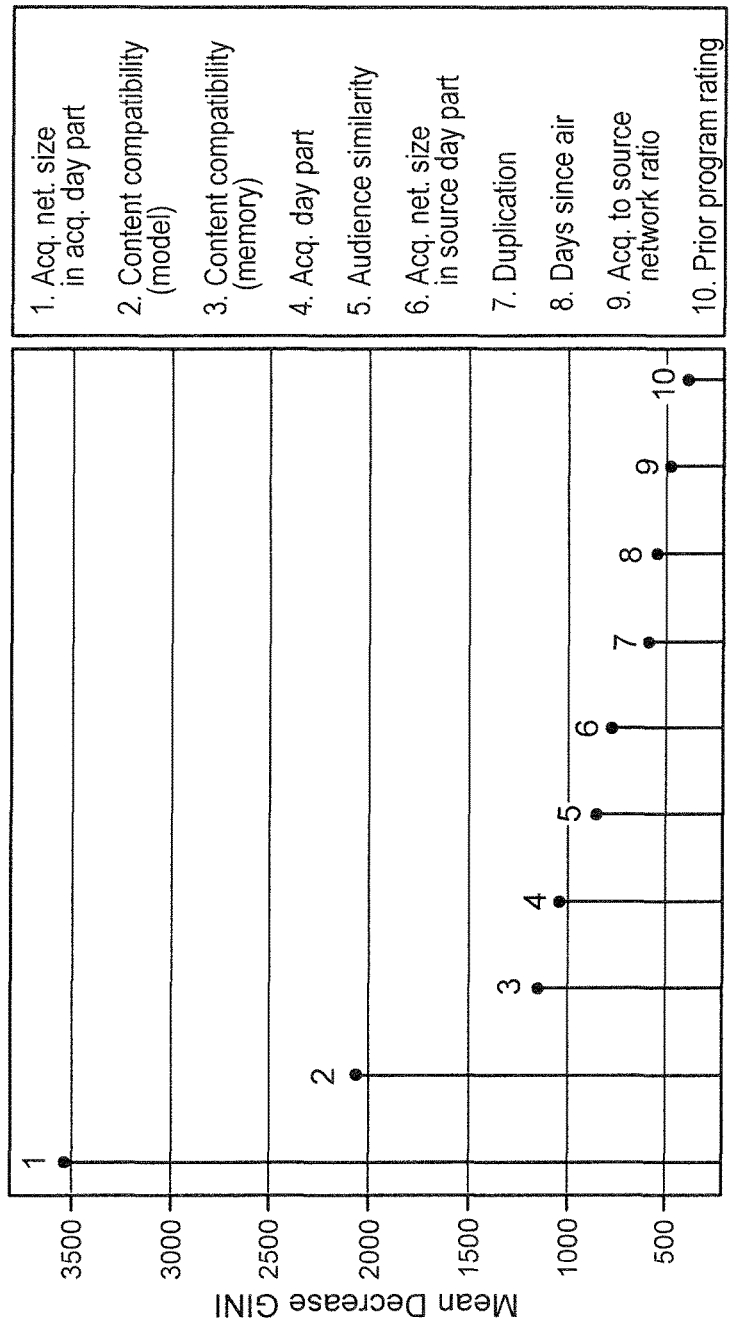
FIG. 9 shows a graph demonstrating the relative importance of several predictive features (e.g., a top 10 most predictive features) used in an exemplary random forest model according to an exemplary embodiment described herein.

FIG. 9 shows a graph 900 demonstrating the relative importance of several predictive features (e.g., a top 10 most predictive features) used in an exemplary random forest model. As illustrated in graph 900, repeat degradation may be considered as the least important variable in the random forest model. This insight is interesting and informative. Specifically, it is useful to know that repeat degradation on previous networks is not inherently a bad indication. However, it is not necessarily an advantage either, but because it has inconsistent effects on future performance, it should not be considered too heavily.

Additional embodiments may allow for the incorporation of additional features to add to the exemplary modeling application, such as program metadata (e.g., from external resources such as Internet Movie Database ("IMDb"), Rotten Tomatoes, etc.). Additional consideration may be applied to programming and/or networks with heavy viewership, and thus the viewers may be more prone to enjoying programs in particular genres, programs that feature certain actors and actresses, and/or programs that follow certain themes or plot lines. Thus, further embodiments may quantify the probability that viewers of a given network would watch a program, simply based on its metadata, and include this variable in the predictive modeling systems and methods.

In order to address issues such as class imbalance in a response variable, additional embodiments may recommend making the random forest cost sensitive by incorporating class weights and penalizing misclassification of smaller classes. Additionally, another proposed embodiment may sample proportionally less from larger classes and more from smaller classes prior to the development of each decision tree to feign the scenario of a more balanced dataset.

Further embodiments may split the data during data preparation into training and test sets. Since multiple observations (e.g., records) may constitute a single acquisition's data, it would be advantageous to ensure that observations are not sent to the test set that are related to data that has been trained on. This dependence may superficially inflate the test set's accuracy, giving false hope for the accuracy of future acquisition predictions. While day part-specific acquisitions may be sampled for the model as the predictions made are day part-specific, but additional embodiments may randomize by other subsets (e.g., such as source network-specific acquisition observations) to understand which sampling method leads to the most independence between training and test sets, and consequently, to the least amount of overfitting.

Furthermore, additional embodiments may use alternative models as well as different modeling frameworks. For instance, one alternative may be to utilize the response variable while remaining within the random forest framework. Another example may be to use binning ratings as the percent deviation from the acquiring network's average as opposed to the ratings themselves. A further example may allow for a transformation on ratings (e.g., exponentiation) that may lead to more accurate classifications. With regard to different modeling frameworks, random forests are flexible and relatively easy to tune, and they generally perform well with classification. However, the exemplary results may be to compared to other machine-learning algorithms, such as neural networks. Taking a separate approach, the response variable may be left continuous while fitting a mixed-effects log-linear model, which is apt to handle continuous, positive data that contains subsets of dependence.

Figure 10:
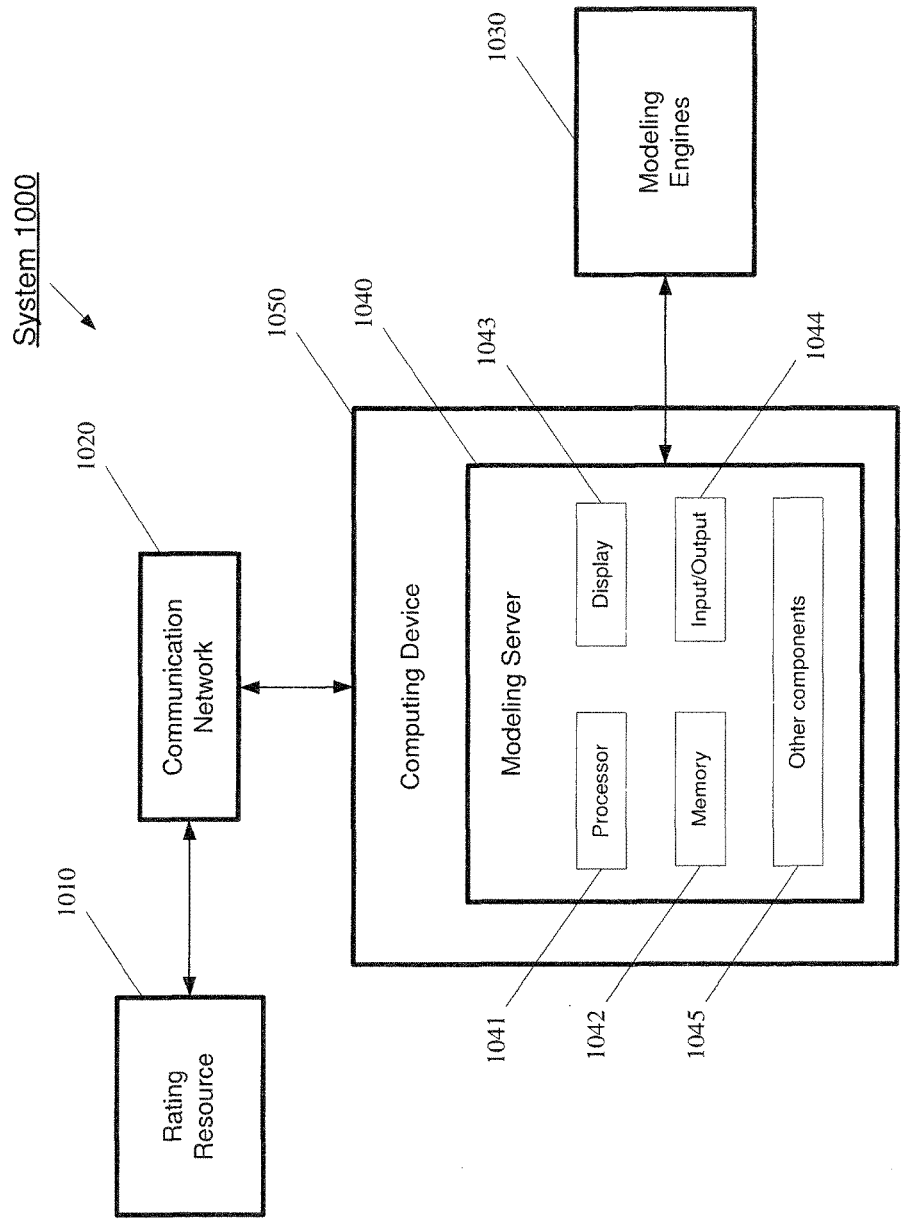
FIG. 10 shows an exemplary system for predicting audience measurements of a television program according to the exemplary embodiments.

FIG. 10 shows an exemplary system 1000 for predicting audience measurements of a television program according to the exemplary embodiments. The system 1000 may utilize features of different predictive acquisition models (e.g., a random forest model, a content compatibility model, etc.) in providing recommendations for acquiring television programming. The system 1000 may include a plurality of rating resources 1010, a communication network 1020, a plurality of modeling engines 1030, and a predictive modeling server 1040 of a computing device 1050. It should be noted that the system 100 is shown with connections between the components. However, those skilled in the art will understand that these connections may be through a wired connection, a wireless connection, interactions between integrated components or software subroutines, or a combination thereof.

The predictive modeling server 1040 may include a processor 1041, a memory arrangement 1042, a display device 1043, an input/output (I/O) device 1044, and other components 1045 (e.g., an audio input device, an audio output device, a battery, a data acquisition device, ports to electrically connect to other electronic devices, etc.).

The exemplary processor 1041 may receive user input from the display 1043 and/or through other components of the device 1045 (e.g., keyboard, mouse, etc.). The exemplary memory 1042 may store instructions, including instructions related to the above-described software application (e.g., predictive modeling application), executable by the processor 1041. Therefore, a user of the computing device 1050 may interact with the software application stored in the memory 1042 of the computing device 1050. The processor 1041 may process these user interactions and adjust the content and modeling configurations.

FIG. 11 shows an exemplary method 1100 for predicting audience measurements of a television program according to the exemplary embodiments. The steps performed by the method 1100 will be described in reference to the exemplary computing device 1050 of the system 1000 and its various components as described above with reference to FIG. 10. For instance, the method 1100 may be included as a modeling application of a set of instructions executable by the processor 1041 of the computing device 1050.

In step 1110, the predictive modeling server 1040 may receive historical data from the external resources. As discussed above, the external resources may include rating service providers, such as viewership ratings (e.g., Nielsen, etc.) and/or critical ratings (e.g., IMDB, Rotten Tomatoes, etc.).

In step 1120, the predictive modeling server 1040 may retrieve prediction data by applying a plurality of acquisition performance predictors on the historical data. The exemplary predictors may include information pertaining to the acquisition network and/or the source network, the current and/or future day part in which the television program had aired/will air, etc. Further factors for the predictors may include current size of the day part at the acquiring network and/or at the source network, audience similarity, content compatibility, etc. It is noted that there is no limit as to the number of factors that may be considered as a predictor for acquisition performance modeling. For instance, examples of positive predictors may include high ratings on the source network, similar demographic and socioeconomic audience composition between the acquiring network and the source network, good content fit for the acquiring network/brand, stable ratings on repeat airings, low duplication between the acquiring network's core audience and the source network audience that watched original episode airings, etc.

In step 1130, the predictive modeling server 1040 may generate a comprehensive prediction model based on the plurality of acquisition performance predictors. As described in detail above, the modeling may include memory-based collaborative filtering, model-based collaborative filtering, etc. Furthermore, the exemplary prediction model may implement any number of modeling techniques, such as a random forest model having several learned relationships.

In step 1140, the predictive modeling server 1040 may input a target program for acquisition into the comprehensive prediction model. In other words, the user of the exemplary computing device 1050 may input a specific television program into the predictive modeling server 1040 as a target program that is being considered for acquisition by a network. Accordingly, this target program may serve as the input data for the prediction model.

In step 1150, the predictive modeling server 1040 may generate a recommendation as to whether the target program should be acquired based on the comprehensive prediction model and the plurality of acquisition performance predictors on the historical data.

As described above, the exemplary systems and methods may revolutionize the way decisions are made in the media industry. More specifically, the systems and methods may help guide decision makers at networks and beyond toward a decision-making process while determining whether to acquire television programming. The exemplary data-driven insights and prediction models described herein may change the way a program acquisition team operates for a network.

To encourage decision makers to use more data-driven strategies, the results of the acquisition model may be incorporated into an easily accessible application, opening the world of data science to those outside of analytical fields at an exemplary network or company. Acquisition experts, marketers, and content strategists are now able to employ advanced analytics beyond any traditional research (e.g., reporting) that they used previously. The interactive visuals of the modeling application may "gamify" data to make it more approachable to colleagues who may have shied away from quantitative analyses in the past. for example, decision makers can run on-demand analyses during negotiation discussions to support their claims, engendering more cost-effective syndication deals.

Furthermore, the exemplary systems and methods may allow for the delivery of superior television content that is specifically targeted to a specific network brands' audiences, benefitting both that network company and the loyal fans who engage with the networks every day.

Those of skill in the art will understand that the above-described exemplary embodiments may be implemented in any number of matters, including as a program recommendation engine, as a software program, etc. For example, the exemplary method 1100 may be embodied in a program stored in a non-transitory storage medium and containing lines of code that, when compiled, may be executed by a processor (e.g., processor 1041 of computing device system 1000). Furthermore, one skilled in the art will understand that the exemplary software application may be coded in any computer readable language, such as, for example, a markup language (e.g., HTML5, etc.).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    at a predictive modeling server:
        inputting a target program for acquisition by a first broadcast entity into a prediction model, wherein the target program has historical viewer ship data on a second broadcast entity, wherein the prediction model is based on a plurality of television acquisition performance predictors, wherein the television acquisition performance predictors are based on an audience similarity value, an audience viewing behavior, and a program similarity value, the audience similarity value indicating how similar characteristics of a first audience associated with the first broadcast entity is to characteristics of a second audience associated with the second broadcast entity, the audience viewing behavior indicating viewing statistics of the first audience for historical programs broadcast by the first broadcast entity, the program similarity value indicating how similar the target program is to the historical programs based on the audience viewing behavior; and generating a recommendation as to whether the target program should be acquired by the first broadcast entity for broadcasting by the first broadcast entity, the recommendation based on an expected viewership by the first audience using the historical viewership data based on the prediction model and the plurality of television acquisition performance predictors.

2. The method of claim 1, further comprising:
receiving historical data from an external resource, wherein the historical data includes television ratings information.

3. The method of claim 2, wherein the audience similarity value is determined by:
determining a source audience group characteristic based on the historical data;
determining an acquiring audience group characteristic based on the plurality of television acquisition performance predictors; and
gauging audience similarity between the source audience group characteristic and the acquiring audience group characteristic.

4. The method of claim 1, further comprising:
retrieving prediction data by applying the plurality of acquisition performance predictors on historical data.

5. The method of claim 1, further comprising:
creating the prediction model based on the plurality of acquisition performance predictors, wherein the prediction model utilizes one of collaborative filtering, clustering and cosine similarity analysis.

6. The method of claim 1, wherein the program similarity value is determined by:
receiving historical viewer behavior data, including preference information and viewing duration information;
determining a similarity between a plurality of television programs based on the historical viewer behavior data; and
generating a memory-based content compatibility score for each of the plurality of television programs based on the determined similarity between the plurality of television programs.

7. The method of claim 1, wherein the recommendation as to whether the target program should be acquired is generated in a software application.

8. A non-transitory computer readable storage medium with an executable program stored thereon, wherein the program instructs a processor to perform actions that include:
inputting a target program for acquisition by a first broadcast entity into a prediction model, wherein the target program has historical viewer ship data on a second broadcast entity, wherein the prediction model is based on a plurality of television acquisition performance predictors, wherein the television acquisition performance predictors are based on an audience similarity value, an audience viewing behavior, and a program similarity value, the audience similarity value indicating how similar characteristics of a first audience associated with the first broadcast entity is to characteristics of a second audience associated with the second broadcast entity, the audience viewing behavior indicating viewing statistics of the first audience for historical programs broadcast by the first broadcast entity, the program similarity value indicating how similar the target program is to the historical programs based on the audience viewing behavior; and generating a recommendation as to whether the target program should be acquired by the first broadcast entity for broadcasting by the first broadcast entity, the recommendation based on an expected viewership by the first audience using the historical viewership data based on the prediction model and the plurality of television acquisition performance predictors.

9. The non-transitory computer readable storage medium of claim 8, wherein the actions further include:
receiving historical data from an external resource, wherein the historical data includes television ratings information.

10. The non-transitory computer readable storage medium of claim 9, wherein the audience similarity value is determined by:
determining a source audience group characteristic based on the historical data;
determining an acquiring audience group characteristic based on the plurality of television acquisition performance predictors; and
gauging audience similarity between the source audience group characteristic and the acquiring audience group characteristic.

11. The non-transitory computer readable storage medium of claim 8, wherein the actions further include:
retrieving prediction data by applying the plurality of acquisition performance predictors on historical data.

12. The non-transitory computer readable storage medium of claim 8, wherein the actions further include:
creating the prediction model based on the plurality of acquisition performance predictors, wherein the prediction model utilizes one of collaborative filtering, clustering and cosine similarity analysis.

13. The non-transitory computer readable storage medium of claim 8, wherein the program similarity value is determined by:
receiving historical viewer behavior data, including preference information and viewing duration information;
determining a similarity between a plurality of television programs based on the historical viewer behavior data; and
generating a memory-based content compatibility score for each of the plurality of television programs based on the determined similarity between the plurality of television programs.

14. The non-transitory computer readable storage medium of claim 8, wherein the recommendation as to whether the target program should be acquired is generated in a software application.

15. A system, comprising:
a memory storing a plurality of rules; and
a processor coupled to the memory and configured to perform actions that include:
inputting a target program for acquisition by a first broadcast entity into a prediction model, wherein the target program has historical viewer ship data on a second broadcast entity, wherein the prediction model is based on a plurality of television acquisition performance predictors, wherein the television acquisition performance predictors are based on an audience similarity value, an audience viewing behavior, and a program similarity value, the audience similarity value indicating how similar characteristics of a first audience associated with the first broadcast entity is to characteristics of a second audience associated with the second broadcast entity, the audience viewing behavior indicating viewing statistics of the first audience for historical programs broadcast by the first broadcast entity, the program similarity value indicating how similar the target program is to the historical programs based on the audience viewing behavior; and generating a recommendation as to whether the target program should be acquired by the first broadcast entity for broadcasting by the first broadcast entity, the recommendation based on an expected viewership by the first audience using the historical viewership data based on the prediction model and the plurality of television acquisition performance predictors.

16. The system of claim 15, wherein the processor is further configured to perform:

receiving historical data from an external resource, wherein the historical data includes television ratings information.

17. The system of claim 16, wherein the processor is further configured to determine the audience similarity value by:

determining a source audience group characteristic based on the historical data;

determining an acquiring audience group characteristic based on the plurality of television acquisition performance predictors; and gauging audience similarity between the source audience group characteristic and the acquiring audience group characteristic.

18. The system of claim 15, wherein the processor is further configured to perform:

retrieving prediction data by applying the plurality of acquisition performance predictors on historical data.

19. The system of claim 15, wherein the processor is further configured to perform:

creating the prediction model based on the plurality of acquisition performance predictors, wherein the prediction model utilizes one of collaborative filtering, clustering and cosine similarity analysis.

20. The system of claim 15, wherein the processor is further configured to determine the program similarity value by:

receiving historical viewer behavior data, including preference information and viewing duration information;

determining a similarity between a plurality of television programs based on the historical viewer behavior data; and generating a memory-based content compatibility score for each of the plurality of television programs based on the determined similarity between the plurality of television programs.

* * * * *